(No Model.)
O. FRÖLICH.
ELECTRIC METER.
No. 490,279. Patented Jan. 24, 1893.
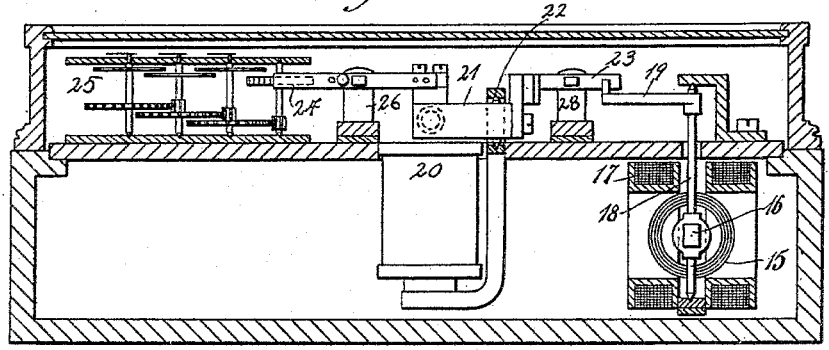
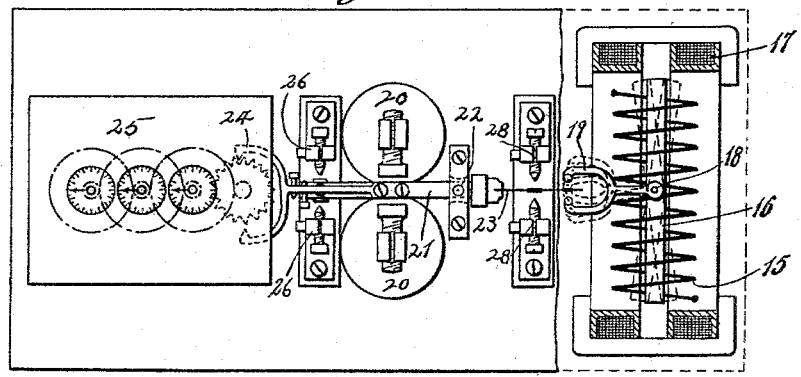
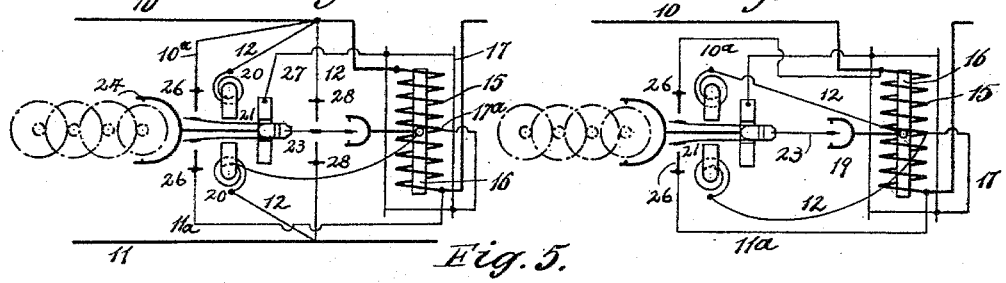
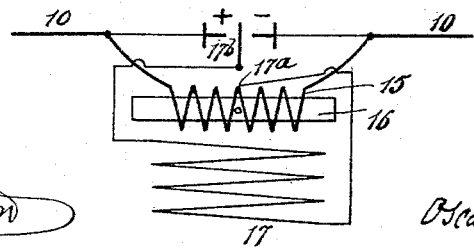
WITNESSES:
Timothy F. Dillon
William X. Otton
INVENTOR
Oscar Frölich
BY
Geo. H. Benjamin
ATTORNEY.
THE NORRIS PETERS CO., PHOTO-LITHO., WASHINGTON, D. C.

UNITED STATES PATENT OFFICE.

OSCAR FRÖLICH, OF BERLIN, GERMANY, ASSIGNOR TO SIEMENS & HALSKE, OF SAME PLACE.

ELECTRIC METER.

SPECIFICATION forming part of Letters Patent No. 490,279, dated January 24, 1893.

Application filed November 16, 1892. Serial No. 452,156. (No model.) Patented in Germany April 16, 1889, No. 50,082; in England July 11, 1889, No. 11,179; in Austria-Hungary July 11, 1889, No. 30,454 and No. 59,934; in Switzerland July 13, 1889, No. 1,366; in France July 15, 1889, No. 199,583; in Belgium July 15, 1889, No. 86,985, and in Italy July 24, 1889, No. 25,875.

*To all whom it may concern:*

Be it known that I, OSCAR FRÖLICH, a citizen of Switzerland, residing at the city of Berlin, in the German Empire, have invented new and useful Improvements in an Electric Meter, (for which I have obtained Letters Patent as follows: in Germany, No. 50,082, dated April 16, 1889; in Belgium, No. 86,985, dated July 15, 1889; in Italy, No. 25,875, dated July 24, 1889; in France, No. 199,583, dated July 15, 1889; in Switzerland, No. 1,366, dated July 13, 1889; in Austria-Hungary, No. 30,454 and No. 59,934, dated July 11, 1889, and in England, No. 11,179, dated July 11, 1889,) of which the following is a specification.

My invention relates to an electric meter, wherein the counter registers the number of oscillations of a bar of soft iron, subject to the influence of the electric current to be measured.

My invention depends upon the following principle: If a bar of soft iron, movable in a horizontal plane be surrounded by two coils, of which the one has a magnetizing and the other a deflecting action on the bar, and if both coils be traversed by the current to be measured, or by fractions thereof, while by means of suitable apparatus, a change of direction of current be effected in one of the two coils, the iron bar will have a regular oscillating motion imparted to it. The motive force acting upon the bar producing such motion will be proportional to the product of the magnetism of the bar into the current flowing through the deflecting coil; if therefore, the proportions be so taken that the magnetism of the bar is proportional to the current flowing through the magnetizing coil, the motive force will be proportional to the square of the main current, as both the magnetizing and deflecting current are proportional to the main current. Further, as the number of oscillations in a unit of time is proportional to the square root of the motive force, the number of oscillations of the iron bar will be proportional to the current to be registered. Hence, if the number of oscillations produced be registered on a counter, the latter will indicate directly the number of ampère hours consumed in the main circuit.

In the accompanying drawings, which illustrate my invention, similar figures of reference indicate like parts.

Figure 1 is a vertical section, and Fig. 2, a sectional plan of an electric meter formed according to my invention. Fig. 3 illustrates the connections, where the relays are connected in series with the magnetizing and deflecting coils, Fig. 4, where the relays are connected in parallel with the magnetizing and deflecting coils. Fig. 5 is a diagram illustrative of the principle of my invention.

Referring first to Fig. 5, 10 represents one of the conductors of the system with which my improved meter is to be employed. The conductor 10 is shown divided in the middle, and the two portions of the conductor connected together by means of a coil 15, which is wound at right angles to the bar of soft iron 16. This coil is that which I denominate the magnetizing coil, and it sets up lines of force in the bar parallel to its axis. 17 represents a coil wound parallel to the bar and connected at the end $17^a$ to the middle of the coil 15; while its other end $17^b$ is located between the divided ends of the main conductor 10. This coil sets up lines of force at right angles to the axis of the bar 16, hence with the coils 15 and 17 active, the bar 16 (supposing it to be pivoted) will assume a position which represents the component of the two forces acting upon it, and such position will be determined by whether the end $17^b$ of the coil 17 is in contact with the plus or minus end of the conductor 10. With the arrangement, as described, the direction of current in the magnetizing coil will always be the same, while the direction of the current in the deflecting coil will be alternately reversed as the point $17^b$ is in contact with the plus or minus ends of the conductor 10.

Referring now to Figs. 1 and 2, 15 indicates the magnetizing coil; 16, the iron bar; 17, the deflecting coil; 18, a pivot upon which the bar 16 oscillates; and 19, a fork connected to the bar 16 and moving with it. 20 are two magnets of a polarized relay, and 21, tongue of relay, pivoted at 22. 23 represents a spring fastened to the tongue of the relay, but insulated from it, and extending backward so as to lie between the parts of the fork 19. Connected to the tongue 21 of the relay is the fork 24, which acts upon the escapement wheels and registering mechanism 25. The circuit connections are shown more fully in Fig. 3. 26 are contacts located on each side of the tongue 21. These contacts are connected to the main circuit conductor 10 by the conductors 10ª and 11ª. The current is conveyed, for instance, from the conductor 10 to conductor 10ª, to contact 26, to tongue 21, by conductor 27 to deflecting coil 17;—the current flowing in the same direction on the opposite side. 28 represents contacts located on each side of the spring 23 and connected to the main line conductors 10 and 11, and through the conductors 12 with the relay 20.

The polarized relay has, as is well known, the property that its tongue is always in contact with one or the other of its stops, excepting the short duration of the transit, so that one of the contacts 26 must be closed; a current consequently always passes from one of the two ends of the magnetizing coil 15 through one of the contacts 26 to the tongue 21 and through its pivot, as also through the deflecting coil 17, to the middle or point of junction 17ª of the magnetizing coil; when the tongue moves over to the other contact 26, the current in the coil 17 changes its direction. It will be understood that the fork 19, in vibrating, cuts first one and then the other of the relay coils into circuit, thereby causing the tongue 21 to vibrate. The momentary currents passing through the relay depend upon the potential difference existing between the two main conductors, and not upon the current to be registered, passing through one of them, for instance 10; and they are without influence on the motion of the iron bar, as these momentary currents, passing through the relay, only serve to effect the reversal of the contact lever.

Instead of coupling the instrument between two conductors 10 and 11, I may use a single one, as shown in Fig. 4, where the coupling is in parallel. In this case, the polarized relay can be actuated by the same currents as those which pass through the deflecting coil; the contact spring 23, in this case, would be in conductive connection with the tongue 21.

The above described electric meter can be variously modified, as will be readily understood by those skilled in the art to which this specification is addressed, and may be used for both continuous and alternating currents, as with the latter, there will also be a motion in one direction of the iron bar so long as the direction of current changes simultaneously in the magnetizing and deflecting coils; if at the reversal of the contact lever, the connection of the deflecting coil be so changed that the direction of the current in the same is under equal circumstances, the reverse of that which existed before the reversal, in which case the movement will be effected in the contrary direction.

The law, which expresses the dependence of the duration of oscillation upon the strength of current, will also remain the same with alternating currents.

I claim as my invention:

1. An electric meter comprising a soft iron bar, capable of oscillating on a central axis, two coils through which the current to be measured, or a fraction thereof, is made to flow, one of such coils wound transversely and the other parallel to said bar, and means for alternately reversing the direction of the current flowing through the coil wound parallel with said bar.

2. An electric meter comprising a soft iron bar, capable of oscillating on a central axis, two coils, one of which is wound transversely to said bar and through which the current to be measured is constantly transmitted, and the other coil is wound parallel to said bar and through it the current to be measured is alternately transmitted in opposite directions, and means for varying the direction of the transmitted current through the second coil.

3. An electric meter comprising a soft iron bar, capable of oscillating on a central axis, two coils through which the current to be measured, or a fraction thereof, is made to flow, one of such coils wound transversely and the other parallel to said bar, means for alternately reversing the direction of the current flowing through the coil wound parallel with said bar, and means for indicating the number of the oscillations of the soft iron bar.

4. An electric meter comprising a soft iron bar, capable of oscillating on a central axis, means for producing a field of force the lines of which are parallel to the axis of the bar, means for producing a field of force the lines of which are at right angles to the axis of the bar, means for alternately reversing the polarity or direction of flow of said last named lines of force, and means for visibly indicating the periodicity of the oscillations of the bar.

5. An electric meter comprising a soft iron bar, capable of oscillating on a central axis, two coils through which the current to be measured, or a fraction thereof, is made to flow, one of such coils wound transversely and the other parallel to said bar, and means consisting of a polarized relay, an intermediate mechanism and circuit connections for alternately reversing the direction of the current flowing through the coil wound parallel with said bar, and means for indicating the number of oscillations of the bar.

In testimony whereof I have affixed my signature in the presence of two witnesses.

OSCAR FRÖLICH.

Witnesses:
 GUSTAV STENZEL,
 MAX WAGNER.